May 23, 1961  H. F. THORN  2,985,223
PAPERBOARD FORMING AND CUTTING APPARATUS
Filed April 11, 1958  2 Sheets-Sheet 1
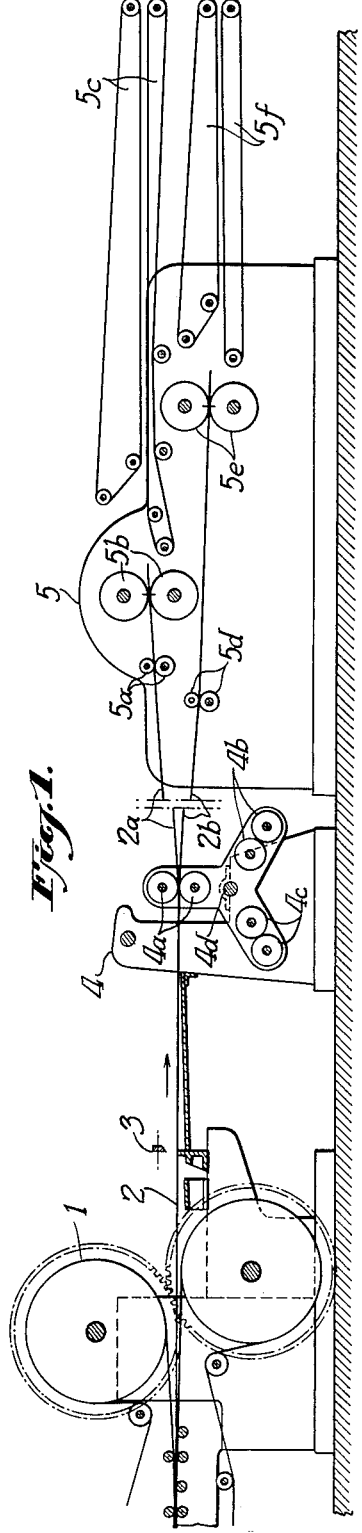
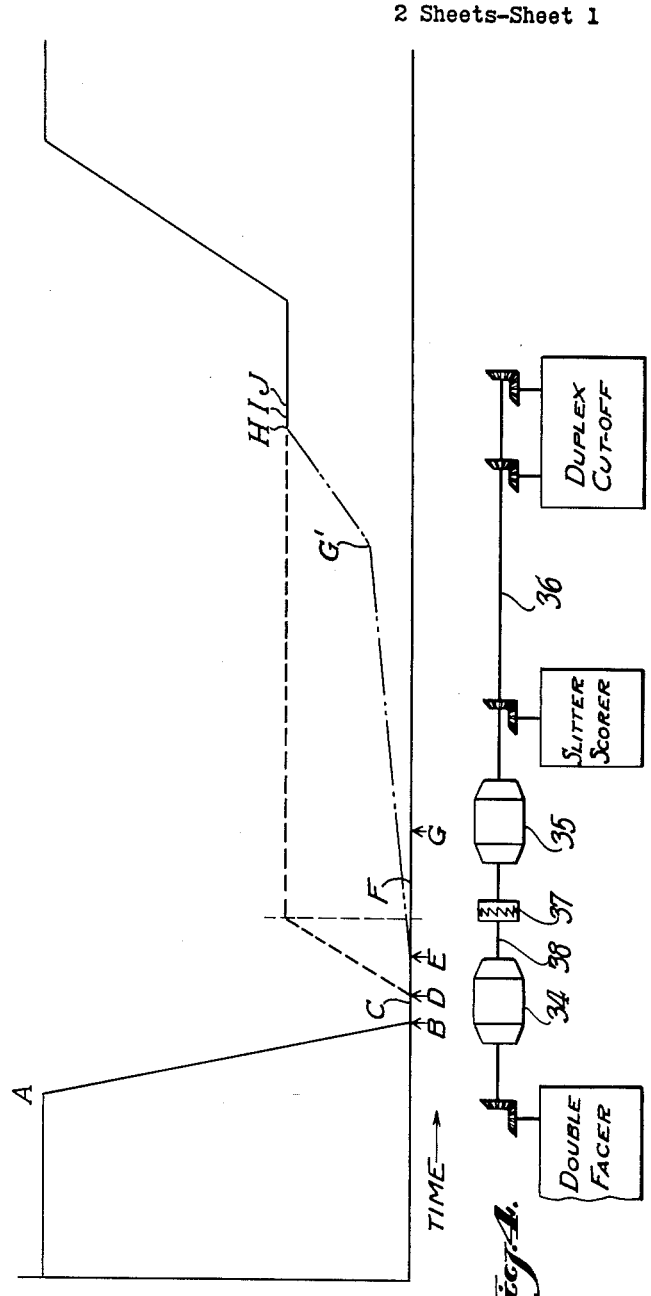
INVENTOR
Harry F. Thorn
BY
ATTORNEY

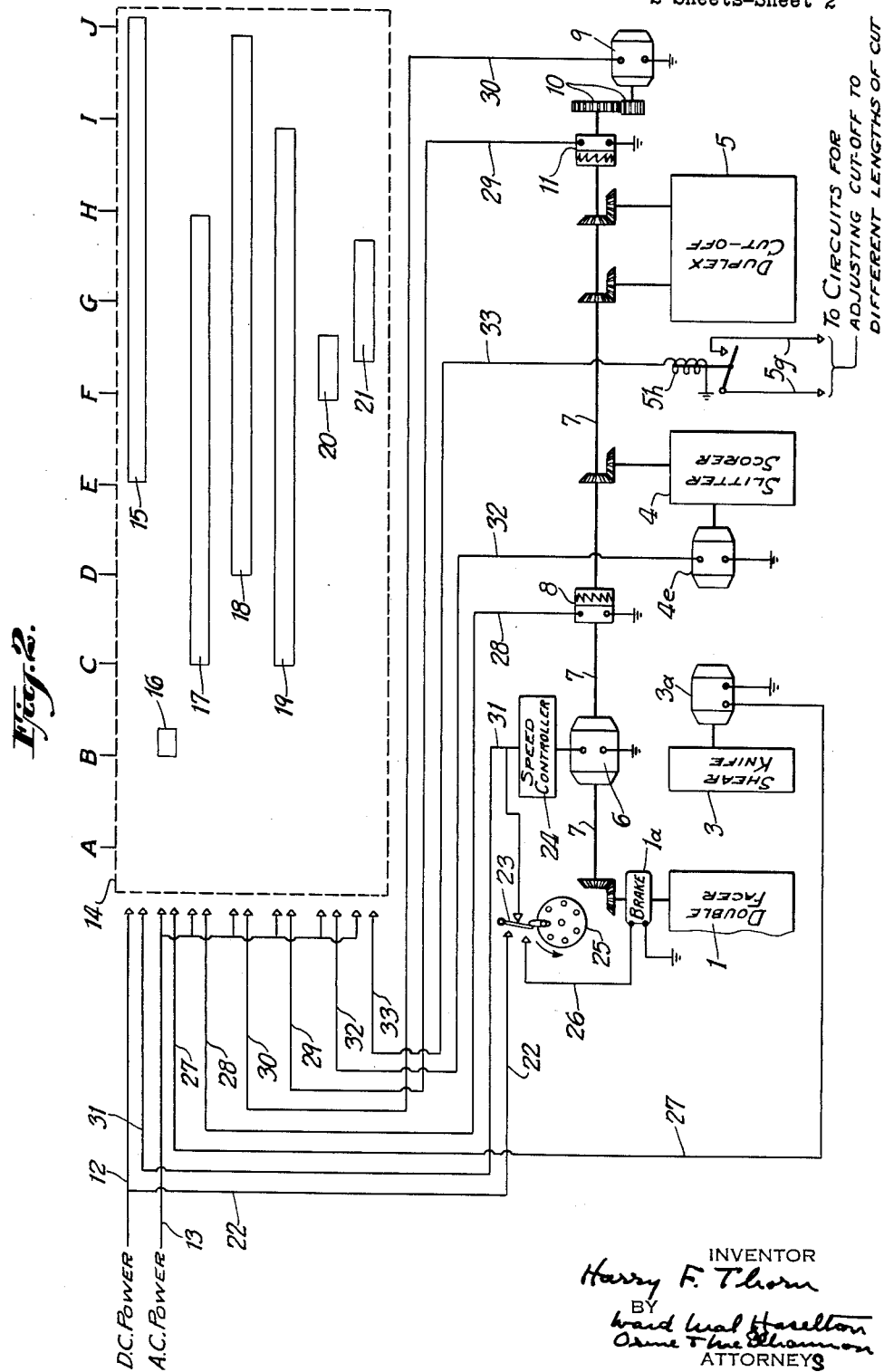

United States Patent Office 2,985,223
Patented May 23, 1961

2,985,223

PAPERBOARD FORMING AND CUTTING APPARATUS

Harry F. Thorn, Trenton, N.J., assignor, by mesne assignments, to Koppers Company, Inc., Pittsburgh, Pa., a corporation of Delaware Filed Apr. 11, 1958, Ser. No. 728,008

3 Claims. (Cl. 154—31)

In the production of corrugated paperboard blanks of various dimensions it has long been the practice to conduct the paperboard as it leaves the double-facer which completes it, first past a shear knife which remains idle while a run of blanks of given dimensions is being completed; then through a slitter-scorer which slits the traveling board longitudinally into sections of selected widths and forms longitudinal creases in said sections; after which the sections pass respectively through the sets of cutting blades which are provided in a duplex cutoff, where the sections are cut transversely into blanks of selected lengths. To alter the lengths of the blanks thus cut it is necessary to make certain adjustments affecting the sets of cutting blades in the cutoff, and appropriate apparatus including servo-motors, control circuits, etc. has long been known for making such adjustments as needed. Also when a new run is to produce blanks of widths different than in the previous run or with the scorelines differently spaced, the slitter-scorer has to be adjusted at the end of the previous run to conform to the dimensions of the new run. As customarily constructed, slitter-scorers have been provided with sets of slitters and creasers so arranged that while certain of them were in operation, others were idle and accessible for adjustment to the positions needed for the run next to come. Thus while one run of blanks was in progress the above adjustments in spacing were made in the slitter-scorer as needed for the next run, and between runs the sets of slitters and scorers which had been active during the previous run were shifted to idle position, and those which had been adjusted for the new run were shifted into active position.

Slitter-scorers which function in the above manner have long been known in which the above mentioned shifting operations require that certain parts be moved across the path of travel of the paperboard web through the machine. With such machines the above shifting operations cannot be performed while the paperboard web is passing through the slitter-scorer, and to enable the above shifting operations to be performed along with the other so called "change-over" adjustments needed between runs, it has long been known to sever the web transversely by the shear knife above referred to, the double facer being either stopped or markedly slowed down to hold back the forward feed of the portion of the web behind the point of severance, until the "tail" portion of the web ahead of the point of severance had passed through the slitter-scorer, the slitter-scorer being thereupon shifted as above described before the portion of the web behind the point of severance was fed to the slitter-scorer. During the changeover period the cutoff was adjusted as needed, and after completion of the necessary change-over operations the double facer was brought up to the speed of feed of the slitter and cutoff, and the three successive machines were recoupled together and operated in unison in normal manner until completion of the next run of blanks.

The present invention comprehends a method and apparatus for performing changeover operations of the above character, and involves the use of a first electric motor which controls the operation of the double facer during the changeover period, either to stop or markedly slow down the forward feed of the web by the double facer until the slitter-scorer is shifted as above described, and to bring the double facer up to the speed of feed of the slitter-scorer and cutoff in the final phase of the changeover period; in combination with a second electric motor which controls the operation of the slitter-scorer and cutoff during the changeover period, to feed the tail of the forward severed portion of the web through the slitter-scorer and cutoff, and keep the last mentioned machines in motion until the double facer is recoupled thereto as above stated. After the changeover has been completed, the three machines may be driven in unison either by the first mentioned motor acting alone, or by the two motors acting in combination, the motors being appropriately synchronized as to speed (as may be done by known forms of mechanical or electrical interlock) at times when they are conjointly driving the machines. The sequence of successive steps as performed during the changeover period, may be effected automatically or manually, in whole or in part.

Further objects of the invention will be in part obvious and in part specifically referred to in the description hereinafter contained which taken in conjunction with the accompanying drawings, discloses apparatus of preferred form which is arranged to function in accordance with the invention; the disclosure however should be considered as merely illustrative of the invention in its broader aspects. In the drawings Fig. 1 is a simplified side view showing a double facer, slitter-scorer, and duplex cutoff such as may be used in practicing the present invention, and with paperboard running therethrough.

Fig. 2 is a diagramatic view showing schematically, successive machines of the character shown in Fig. 1 in combination with appropriate apparatus and control circuits for effecting changeover operations in accordance with the invention.

Fig. 3 is a diagram in which speed is plotted against time, to show the operating conditions existing at various stages during the changeover period, in use of apparatus as shown in Fig. 2.

Fig. 4 is a view similar to Fig. 2 but showing a somewhat modified changeover apparatus.

In Fig. 1 a double facer is indicated generally at 1, from the delivery end of which a web of corrugated paperboard 2 issues at a speed of feed which depends upon the speed at which the double facer is driven, and appropriate forms of which are known in the art. This machine accordingly will not be described in greater detail. The web 2 then travels past a shear knife as indicated schematically at 3, which as above stated remains idle during a run of blanks of given dimensions, but is operated at the beginning of the changeover period to sever the web transversely. Various forms of shear knife appropriate for this purpose are known in the art, some being of the so called guillotine type which may be used if the web is to be severed while at rest, and others of the so called traveling type which may be used if the web is to be severed while in motion.

The web then passes to a slitter-scorer as indicated at 4 in Fig. 1, which functions to slit the web longitudinally into strips 2a and 2b, and to crease the strips longitudinally as previously mentioned. Fig. 1 shows in simplified form three alternatively usable sets of slitting and scoring disks 4a, 4b and 4c, which by angular movement about the central shaft 4d, may be selectively adjusted into operative position across the path of travel of the web 2. Appropriate forms of slitter-scorer, along with appropriate motors, stop and start mechanisms etc. for shifting the sets of disks between idle and operating position are also well known in the art, and will not be described in detail.

The paperboard strips 2a and 2b next pass to a duplex cutoff as indicated at 5 in Fig. 1. The strip 2a may be understood as passing through one set of feed rolls 5a to one set of cutoff knives as indicated at 5b, which sever the traveling web into blanks of one length, after which the completed blanks are delivered on to a belt conveyor as indicated at 5c. The web 2b may be understood as passing through a set of feed rolls 5d to a second pair of cutoff knives 5e, which sever the web 2b transversely into blanks which may be of a length different from those cut by the knives 5b, after which the completed blanks pass to a delivery conveyor 5f. Cutoff mechanisms appropriate for the above purposes are also known in the art, along with appropriate adjusting means, control circuits, etc. for adjusting each of the sets of cutoff knives 5b and 5e, as needed to shift from one length of cut to another length of cut. In some instances the extent of these adjustments to secure the desired lengths of cut for a new run of blanks are manually controlled by the operator, and in other instances appropriate stop and start mechanisms are used which may be set according to the length of cut desired. This phase of the machine accordingly will not be described in greater detail.

Fig. 2 shows schematically a preferred form of apparatus for practicing the invention, the double facer 1 being provided with a brake 1a appropriate for bringing the double facer and the paperboard traveling therethrough quickly to rest near the end of a run of blanks. In Fig. 2 the shear knife 3 is shown as actuated by a motor 3a which should be understood as operating the knife through one stroke. The slitter-scorer 4 is shown in Fig. 2 as provided with a motor 4e for adjusting the sets of slitting and scoring disks between idle and operating position as above described. In Fig. 2 the duplex cutoff 5 is shown in conjunction with a circuit 5g which may be understood as controlled by the relay 5h, for the purpose of appropriately shifting the cutters of the cutoff from one length of cut to another.

In the preferred form of the invention shown in Fig. 2, during a run of blanks of given length, all three of the machines 1, 3 and 5 are powered by a variable speed electrical motor 6 connected to the several machines by a line shaft 7 extending along the successive machines and connected thereto by appropriate gearing as shown. However a clutch 8 is interposed in this line shaft between the motor 6 and double facer 1 on the one hand, and the slitter-scorer and duplex cutoff on the other hand, in such manner that by opening the clutch 8, the motor 6 may drive the double facer but without affecting the slitter-scorer or the duplex cutoff 5. Also an auxiliary constant speed electric motor 9 is connected to the shaft 7, through appropriate reduction gearing as indicated at 10 in Fig. 2, and a clutch 11 is interposed between the motor 9 on the one hand and the machines 4 and 5 on the other hand, in such manner that when clutch 8 is open and clutch 11 is closed, the auxiliary motor 9 will drive the slitter-scorer and duplex cutoff in unison, without affecting the double facer 1.

By the use of the two motors 6 and 9, and the clutches 8 and 11 coordinated therewith and with the machines 1, 3 and 5 as above described, the speed of operation of the slitter-scorer and cutoff on the one hand (and therefore the speed of feed of the material therethrough); and the speed of operation of the double facer 1 on the other hand (and therefore the speed of feed of the material therethrough), may be independently regulated and controlled during the changeover period respectively by the motors 9 and 6, to enable the slitter-scorer to be adjusted as above described after the tail of the run of blanks being completed has passed through the slitter-scorer, and prior to the time when the forward edge of the web issuing from the double backer reaches the slitter-scorer.

In the same way if desired, the adjustment of the duplex cutoff may be made after the "tail" of the run of blanks which is being completed, has passed through the cutoff, and prior to the time when the forward edge of the web which is to constitute the new run of blanks, reaches the cutoff.

Fig. 2 shows schematically electrical circuits, etc. appropriate for the above purposes, one side of each circuit being shown as grounded, for purposes of simplicity. At the upper left of Fig. 2 a D.C. power conductor 12 is shown, and also an A.C. power conductor 13. The dotted rectangle 14 indicates schematically the development of what may be understood as a drum type controller which comes into operation (either automatically or manually) near the end of a given run of blanks, and operates through one cycle, this drum having contacts 15, 16, 17, 18, 19, 20 and 21 which respectively close circuit between the sets of stationary contacts shown at the left of the rectangle 14 in Fig. 2. The letters A–J above the rectangle 14 in Fig. 1 indicate successive phases of the changeover operation.

Prior to the beginning of the changeover period, i.e. during the continuance of a run of blanks, the motor 6 should be understood as driving the three successive machines through the shaft 7, clutch 8 being closed, and clutch 11 being open and motor 9 shut down. Shortly prior to the initiation of the changeover steps the speed of feed of the train of machines may be slowed down to a point substantially below normal production speed— say to about 100 ft. per min. During the run the motor 6 may be understood as powered through a conductor 22 in which a switch 23 is interposed, from which D.C. power to motor 6 passes through a speed controller for the motor as indicated schematically at 24 in Fig. 2.

Fig. 2 also indicates schematically at 25 a counter mechanism (which may be of known construction and mode of operation) which is so set that near the completion of the run, the counter 25 shifts the switch 23 to open circuit from conductor 22 to the motor 6. This brings the train of machines and the material entrained therewith to rest, the switch 23 shifting to a position where it closes circuit through a conductor 26 to the brake 1a, which brings the double facer and the entrained material quickly to rest, at the initial changeover stage indicated at A in Fig. 2.

Then at stage B, the contact 16 closes circuit through the conductor 27 to the motor 3a which actuates the shear knife 3, causing the latter to sever the web (which is then held statonary) transversely at a point on the delivery side of the double facer 1.

As stage C of the changeover is reached, the contact 17 closes circuit to the clutch 8 through conductor 28, opening clutch 8 to disconnect motor 6 from the slitter-scorer and cutoff. At the same time the contact 19 closes a circuit leading through conductor 29 to the clutch 11 to close the latter, thereby connecting the motor 9 into driving relation to the machines 4 and 5, but independently of the double facer 1 since clutch 8 was opened at stage C.

In the next following stage D, contact 18 closes circuit from the A.C. power line 13 through conductor 30 to the motor 9, thereby causing the latter to drive the slitter-scorer and cutoff, and resume the feed therethrough of the "tail" of the forward section of the web which had just been severed by shear knife 3.

At the next following stage E, the contact 15 closes circuit through conductor 31 from the D.C. power line 12 through speed controller 24 to motor 6, causing the latter to reactivate the double facer and resume the feed toward the slitter-scorer, of the material previously held in the double facer (behind the point of cut of shear knife 3).

At the next succeeding changeover stage F, the "tail" of the forward section of the material has passed through the slitter-scorer, but the forward edge of the rear section of the material which is being fed toward the slitter-scorer as above described, has not yet reached the latter. At this stage the contact 20 closes circuit through conductor 32 to the motor 4e which shifts the slitter-scorer as above described to the new setting needed for the next run of blanks, this adjustment being completed before further material reaches the slitter-scorer. Thereupon the contact 21 closes circuit through conductor 33 to the relay 5h, closing the circuit 5g to initiate the adjustments in the cutoff 5 which are needed to accommodate the machine to the new lengths of blank to be cut during the next run. The adjustment of the cutoff is not necessarily delayed until after the "tail" of the forward section of the material has passed through the cutoff. If the material is being run through the cutoff during its adjustment, a few blanks of odd lengths will be cut, but usually without serious economic loss, and the time required for changeover will be shortened if the adjustment of the cutoff is initiated before the "tail" of the forward section has passed therethrough. In Fig. 2 the adjustment of the slitter-scorer is indicated as completed shortly prior to stage G, and the adjustment of the cutoff completed shortly prior to stage H.

When the stage H is reached, the speed controller 24 will have brought the motor 6 up to a speed at which the material traveling forwardly from the double facer has reached a speed of feed substantially the same as produced in the slitter-scorer and cutoff by motor 9, for example about 100 ft. per min.—in other words the two motors will then be synchronized in respect to the speed of feed thereby produced, and at stage H the contact 17 breaks circuit to the conductor 28 so that clutch 8 closes to reconnect the motor 6 to the slitter-scorer and cutoff, while the motor 9 is still in driving relation thereto. At stage I the contact 19 opens circuit to the conductor 29, thereby opening the clutch 11 to disconnect motor 9 from driving relation to the slitter-scorer and cutoff. Then as indicated at phase J, the contact 18 moves to open circuit to the conductor 30 and thereby break circuit to motor 9 and throw the latter out of action, the three successive machines 1, 4, and 5 being driven in unison by the motor 6 from then on. In Fig. 2 the contact 15 is indicated as maintaining circuit to the motor 6 somewhat after the phase J has been reached, at which phase the production of the new run of blanks is already underway. It should be understood that by the time the contact 15 moves to a position where circuit to motor 6 is opened through conductor 31, the counter 25 will have been moved to its initial setting for the new run, in which position circuit to motor 6 will be maintained through the switch 23 while the new run of blanks proceeds. During the run the production speed of feed of the material may be appropriately regulated, usually by manual adjustment of the speed controller 24.

Fig. 3 is in the nature of a graph wherein speed of feed is plotted against time to indicate the operating conditions obtaining at various stages of the changeover period. The upper left hand horizontal portion of the graph indicates the travel of the material at normal production speed during the latter part of a production run, until the stage A is reached, whereupon the motor 6 is deenergized and the brake 1a is applied as previously described in connection with Fig. 2, to bring the successive machines and the paperboard web quickly to rest, as indicated at the phase B of the graph. At this time the shear knife 3 is operated as previously described to sever the web transversely. Then at the phase C, the clutch 8 is disengaged and the clutch 11 engaged as previously described. At the phase D the motor 9 is energized as previously described, and the dotted line portion of the graph in Fig. 3 indicates how this motor comes quickly to speed, to feed the tail of the forward severed section of the material through the slitter-scorer and cutoff at a speed of feed for example of about 100 ft. per min. During the initial portion of this resumption of feed of the forward section, the rear portion of the web which is held in the double backer remains stationary until the phase E is reached, when the motor 6 is energized as previously described. This motor gradually accelerates the speed of feed of the material in the double facer as indicated by the dot and dash portion of the graph in Fig. 3. When the phase F is reached, at which the tail of the forward severed section of the web has passed through the slitter-scorer, the adjusting motor 4e is energized as already described to adjust the slitter-scorer as needed for the next run. At the point G of Fig. 3, the tail of the forward section of the web has passed through the cutoff, and adjustment of the cutoff for the next run is then begun as previously described. By the time the point $G^1$ of Fig. 3 is reached, the leading edge of the rear section of the paperboard web (which in the meantime has been fed forwardly by motor 6) will have entered the slitter-scorer to be slitted and scored as needed for the new run, and from then on the speed controller 24 may operate to accelerate the motor 6 more rapidly as indicated by the steeper portion of the dot and dash curve in Fig. 3, until the phase H is reached. At this time the clutch 8 is reengaged as previously described to couple the motor 6 to the slitter-scorer and cutoff. Then at the phase I the clutch 11 is disengaged, and at phase J the motor 9 is deenergized as previously described. In the meantime the adjustment of the cutoff to suit the new run of blanks will have been completed, before the leading edge of the paperboard web for the new run reaches the cutoff, and from then on the speed of motor 6 may be regulated to bring the speed of feed to the material up to normal production rate, as indicated by the solid line, right hand portion of the curve of Fig. 3.

In connection with the sequence of changeover steps as above described, the material in the double facer may be understood as held stationary for a period of only a few seconds (between the phases B and E above referred to) and the entire period of changeover need not consume longer than about 25–30 seconds—assuming that the range of adjustment needed for the cutoff is not greater than normally required in usual practice. It is of course advantageous that the changeover operations be performed with sufficient rapidity to avoid injury to the material which is temporarily held back from passage through the double facer, as may happen if the period of hold back is too long.

Fig. 4 shows schematically a somewhat modified form of apparatus which may be used in carrying out the invention. In this instance the double facer may be understood as driven by a variable speed D.C. motor 34 similar to the motor 6 previously described, but which as later set forth in greater detail, need be only of about one half the power of motor 6. In the form of apparatus shown in Fig. 4, a second variable speed D.C. motor 35, which may be understood as identical with motor 34, is connected in driving relation to the slitter-scorer and cutoff through shaft 36 and appropriate gearing. In Fig. 4 a clutch 37 and shaft 38 are interposed between the motors 34 and 35 to serve as a mechanical interlock keeping the two motors in synchronized relation as to speed when clutch 37 is engaged.

During a production run, the two motors act conjointly to drive the double facer, slitter-scorer and cutoff in synchronized relation, the clutch 37 being then engaged. The total power requirements for motors 34 and 35 will be the same as for the single motor 6 previously described. Near the end of the run, both motors may be deenergized to bring all of the above machines and the entrained material to rest as already described, the clutch 37 being then disengaged and the motors 34 and 35 thereafter separately started and regulated as part of a sequence of operation similar to that above described in connection with Fig. 3. Or if desired, near the end of a production run and without stopping the forward feed of the material, the web may be severed transversely by a traveling shear knife, the clutch 37 being thereupon disengaged and the motor 34 stopped or temporarily slowed down, to allow for adjustment of the slitter-scorer between the time when the tail of the forward severed section of the web has passed through the slitter-scorer, and the time when the leading edge of the rear section of the web reaches the slitter-scorer. The motor 35 drives the slitter-scorer and cutoff during the above phase of the changeover. Then after the motor 34 has been regulated to bring the speed of the double facer up to that of the slitter-scorer and duplex cutoff (comparable to the phase H shown in Fig. 3) the clutch 37 will be engaged to connect the two motors 34 and 35 in synchronized relation, after which the two motors will carry on to conjointly drive the train of machines during the new production run.

In the above described operation the double facer acts as a web feeding means, and the variable speed motor 6 or 34 which drives the double facer is regulated to halt or slow down the forward feed of the section of the web behind the point of cut of the shear knife. In the meantime the motor 9 or 35 which during the changeover period drives the slitter-scorer and cutoff independently of the last mentioned section of the web and the double facer, feeds the forward section of the web through the slitter-scorer and cutoff to clear the way so to speak, for the adjustments needed in these machines for the new run. The provision of the two motors for the above respective purposes affords an advantageous flexibility and simplicity of control over the conditions of operation during the changeover period, and facilitates the rapid completion of the changeover sequence of steps.

While the invention has been disclosed as carried out by the aid of the above described forms of apparatus, it should be understood that changes may be made therein without departing from the invention in its broader aspects, within the scope of the appended claims. It should be understood that the so called slitter and scorer may be a machine which performs either, or both of the above mentioned slitting and scoring operations.

I claim:

1. Paperboard blank producing apparatus of the character described, including a double facer, a slitter, and a cutoff disposed in succession, a shear knife interposed between the double facer and slitter, a first electric motor, means for coupling said motor in driving relation to the double facer, a second electric motor, means for coupling the second motor in driving relation to the slitter and cutoff, a clutch interposed between the first motor and double facer on the one hand, and said second motor, slitter and cutoff on the other hand, means for actuating said shear knife toward the end of a run of blanks to sever transversely a web to be cut up into blanks, and means for respectively changing circuit to said motors and for engaging and disengaging said clutch, to cause the first motor, after the actuation of said shear knife, to drive the double facer independently of the slitter and cutoff, and to cause the second motor, after actuation of said shear knife, to drive said slitter and cutoff independently of said double facer to advance the forward section of the web as severed by the shear knife, with respect to the rearward section of the web, and means operable after the forward section of the web has passed the slitter, and before the rear section of the web has reached the slitter, for adjusting the slitter into position for a new run of blanks.

2. Paperboard blank producing apparatus of the character described, including a double facer, a slitter, and a cutoff disposed in succession, a shear knife interposed between the double facer and slitter, a first electric motor, means for coupling said motor in driving relation to the double facer, a second electric motor, means for coupling the second motor in driving relation to the slitter and cutoff, a clutch interposed between the first motor and double facer on the one hand, and said second motor, slitter and cutoff on the other hand, means for actuating said shear knife toward the end of a run of blanks to sever transversely a web to be cut up into blanks, and means for respectively changing circuit to said motors and for engaging and disengaging said clutch, to stop both of the motors and disengage the clutch, then energize the second motor to activate the slitter and cutoff independently of the double facer, to advance the forward section of the web as severed by the shear knife, with respect to the rearward section thereof, and thereafter energize the first motor to activate and accelerate the double facer independently of the slitter and cutoff, means operable by said circuit changing means after the forward section of the web has passed the slitter and before the rearward section thereof has reached the slitter, for adjusting the slitter into position for a new run of blanks, said circuit changing means also being operable to reengage the clutch and deenergize the second motor after the double facer has been accelerated as above set forth, to drive the slitter and cutoff by the first motor.

3. Paperboard blank producing apparatus of the character described, including a double facer, a slitter, and a cutoff disposed in succession, a shear knife interposed between the double facer and slitter, a first electric motor, means for coupling said motor in driving relation to the double facer, a second electric motor, means for coupling the second motor in driving relation to the slitter and cutoff, a first clutch interposed between the first motor and double facer on the one hand, and said second motor, slitter and cutoff on the other hand, a second clutch interposed between the second electric motor and the slitter and cutoff, means for actuating the shear knife toward the end of a run of blanks to sever transversely a web to be cut up into blanks, and means for respectively changing circuit to said motors and for engaging and disengaging the clutches, to stop both of the motors, disengage the first clutch and engage the second clutch, then energize the second motor to activate the slitter and cutoff independently of the double facer to advance the forward section of the web as severed by the shear knife, with respect to the rearward section thereof, and thereafter energize the first motor to activate and accelerate the double facer independently of the slitter and cutoff, means operable by the circuit changing means after the forward section of the web has passed the slitter and before the rearward section thereof has reached the slitter, for adjusting the slitter into position for a new run of blanks, the circuit changing means also being operable to reengage the first clutch, disengage the second clutch and deenergize the second motor after the double facer has been accelerated as above set forth, to drive the slitter and cutoff by the first motor.

References Cited in the file of this patent

UNITED STATES PATENTS

| | | |
|---|---|---|
| 2,055,031 | Hutchings | Sept. 22, 1936 |
| 2,106,500 | Greenwood | Jan. 25, 1938 |
| 2,309,728 | Goettsch | Feb. 2, 1943 |
| 2,504,473 | Van Antwerpen | Apr. 18, 1950 |
| 2,555,343 | Jones | June 5, 1951 |
| 2,656,497 | Schweighofer et al. | Oct. 20, 1953 |